United States Patent
Ozawa et al.

(10) Patent No.: US 6,489,697 B1
(45) Date of Patent: Dec. 3, 2002

(54) ROTATING ELECTRICAL MACHINE WITH IMPROVED CIRCULATING PATH FOR COOLANT

(75) Inventors: Masaru Ozawa, Wako (JP); Kenrou Udono, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 15 days.

(21) Appl. No.: 09/639,542

(22) Filed: Aug. 16, 2000

(30) Foreign Application Priority Data

Aug. 26, 1999 (JP) .......................................... 11-240588

(51) Int. Cl.[7] .............................................. H02K 9/19
(52) U.S. Cl. ............................. 310/54; 310/58; 310/254
(58) Field of Search ............................. 310/52, 54, 58, 310/254

(56) References Cited

U.S. PATENT DOCUMENTS

| | | | |
|---|---|---|---|
| 1,448,700 A | * 2/1923 | Seidner | 310/54 |
| 3,963,950 A | * 6/1976 | Watanabe et al. | 310/54 |
| 4,262,224 A | * 4/1981 | Kofink et al. | 310/54 |
| 5,670,838 A | * 9/1997 | Everton | 310/254 |
| 5,998,905 A | * 12/1999 | Fougere et al. | 310/254 |

FOREIGN PATENT DOCUMENTS

EP 866649 A1 * 9/1998 ................. 310/52

* cited by examiner

*Primary Examiner*—Karl Tamai
(74) *Attorney, Agent, or Firm*—Carrier, Blackman & Associates, P.C.; Joseph P. Carrier; William D. Blackman

(57) ABSTRACT

A rotating electrical machine includes, a cooling circuit 4 is provided for introducing oil to inside a housing, for cooling an inner periphery and outer periphery of a slotless stator in that order. Moreover, there is also provided a cover plate for preventing back flow of the oil introduced to inside the housings, to an outer peripheral side of the slotless stator 1. As a result, oil which has just been introduced to the housing, and has not yet been supplied for cooling the heat source, is promptly circulated to the inner peripheral side of the stator which requires much more cooling, so that the temperature rise of the overall rotating electrical machine is effectively suppressed. Moreover, a part of the oil introduced to inside the housing is used for lubricating bearings supporting a rotor.

9 Claims, 7 Drawing Sheets

ROTATING ELECTRICAL MACHINE WITH IMPROVED CIRCULATING PATH FOR COOLANT

BACKGROUND OF THE INVENTION

1. Field of the Invention

The present invention relates to a liquid cooled type rotating electrical machine with an improved circulating path for liquid coolant.

2. Description of the Related Art

Heretofore, as a liquid cooled type rotating electrical machine where cooling liquid is introduced into a housing, and a stator is cooled by the cooling liquid, there are known for example, the rotating electrical machines of Japanese Examined Patent Application, Second Publication No. Sho. 60-36696, and U.S. Pat. No. 4709180.

With the former rotating electrical machine, the stator body is cooled by the cooling liquid, while with the latter rotating electrical machine, the cooling liquid is circulated inside the rotor for cooling.

However, when an Nd-Fe-B magnet is used for the rotor, the generating efficiency is increased accompanying the high magnetic flux due to the large energy product. With an increase in temperature of the magnet itself however the magnetic force is reduced, and hence the generating efficiency drops.

On the other hand, in the case where electricity generation is carried out at high rotational speeds exceeding several ten thousand rpm, generating in the stator copper losses and eddy current losses produced in the winding section, and core losses produced in the core section, these losses are all converted to heat so that the stator comes into a high temperature condition.

Therefore, in order to realize high efficiency power generation, it becomes important to efficiently cool the inner periphery of the stator close to the rotor, so that the characteristics of the magnet are not impaired.

SUMMARY OF THE INVENTION

The present invention takes into consideration the above situation with the object of efficiently cooling the stator.

In order to achieve the above object, the present invention adopts the following devices.

That is, according to the present invention, a rotating electrical machine is provided, in which a cylindrical shape stator is accommodated inside a housing, a rotor is rotatably supported on an inner peripheral side of the stator, and a cooling circuit for introduces cooling liquid (oil with this embodiment) to inside the housing for cooling an inner periphery and an outer periphery of the stator in that order.

With this construction, low temperature cooling liquid which has just been introduced to the housing, and has not yet been supplied for cooling the heat source, is promptly circulated to the inner peripheral side of the stator which requires much more cooling than the outer peripheral side of the sator.

Therefore, it becomes possible to efficiently cool the stator using the low temperature cooling liquid. Hence the temperature rise of the overall rotating electrical machine is suppressed.

Furthermore, with the above construction, in the case where there is provided a non return device (a cover plate with this embodiment) for preventing back flow of the cooling liquid introduced inside the housing, to an outer peripheral side of the stator, the cooling liquid introduced to inside the housing is reliably conducted to the inner peripheral side of the stator close to the rotor before to being conducted to the outer peripheral side of the stator far from the rotor.

Furthermore, with either of the above constructions, in the case where the cooling liquid is also used for lubrication of bearings supporting the rotor, the circuit necessary for lubrication and cooling can be simplified.

Moreover, with any of the above constructions, with a stator winding where heat conducting particles (BN particles with this embodiment) are filled into the stator winding, and moreover when a resin such as varnish is also impregnated, into the stator winding this is impregnated with the heat conducting particles mixed into the impregnating resin and is then hardened, then the thermal conductivity of the impregnated resin portion is improved. Hence, heat dissipation of the stator winding is enhanced and the cooling efficiency is further improved.

DESCRIPTION OF THE PREFERRED EMBODIMENTS

Hereunder is a description of embodiments of the present invention with reference to the drawings.

Figure 1:
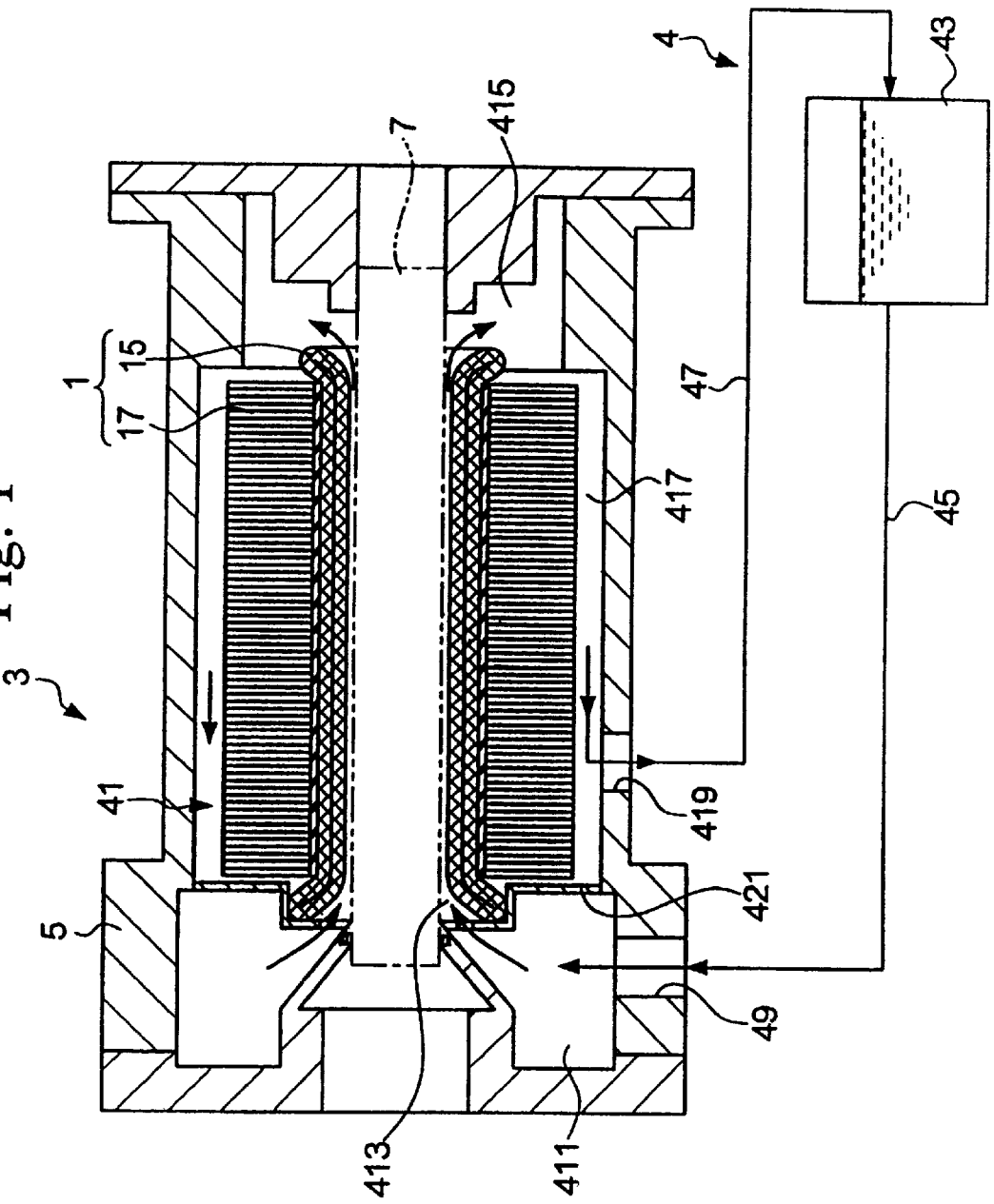
FIG. 1 is a longitudinal cross-sectional view showing an embodiment of a rotating electrical machine according to the present invention.

FIG. 1 shows a rotating electrical machine 3 incorporating a slotless stator 1. This rotating electrical machine 3 is suitable to use in a high speed rotating electric machine which is used for example at several kW to several tens of kW, and at rotational speeds above several ten thousand rpm.

With the rotating electrical machine 3, the outer shape is formed from a easing 5, and a rotor is rotatably arranged via bearings (only one of which is shown) along a central axis of the casing 5.

An oil passage 41 constituting one part of a cooling circuit 4 is formed in the casing 5.

The cooling circuit 4 comprises an oil supply source 43 in which is stored oil cooling liquid) provided for bearing lubrication and cooling of a slotless stator 1, a supply path 45 for conducting oil from the oil supply source 43 to the oil passage 41, and a return path 47 for returning oil from the oil passage 41 to the oil supply source 43.

The oil passage 41 comprises an inlet path 49 at one end of the casing 5 for providing an opening between the inner and outer surfaces, an oil sink 411 communicated with the inlet path 49, a cylindrical shape inner peripheral path 413 communicated with the oil sink 411 at one end and extending along the inner periphery of the slotless stator 1, a turn portion 415 communicated with the other end of the inner peripheral path 413 for U-turning the oil flow direction to the outer peripheral side of the stator, a cylindrical shape outer peripheral path 417 communicated with the turn portion 415 and extending along the outer periphery of the slotless stator 1, a lead out path 419 communicated with the outer peripheral path 417 for providing an opening between the inner and outer surfaces of the casing 5 at an approximately axial central portion, and a ring shape cover plate (non return device) 421 for preventing back flow from the oil sink 411 to the outer peripheral path 417.

A permanent magnet serving as a magnetic field generating device is incorporated into the rotor 7.

The permanent magnet is constructed so that p (where p is an even number of two or more) magnetic poles for generating a magnetic flux in the radial direction, are formed on the outer surface of the rotor 7.

For the permanent magnet, a rare earth magnet such as a Sm—Co, Nd—Fe—B sintered magnet is suitable.

Figure 2:
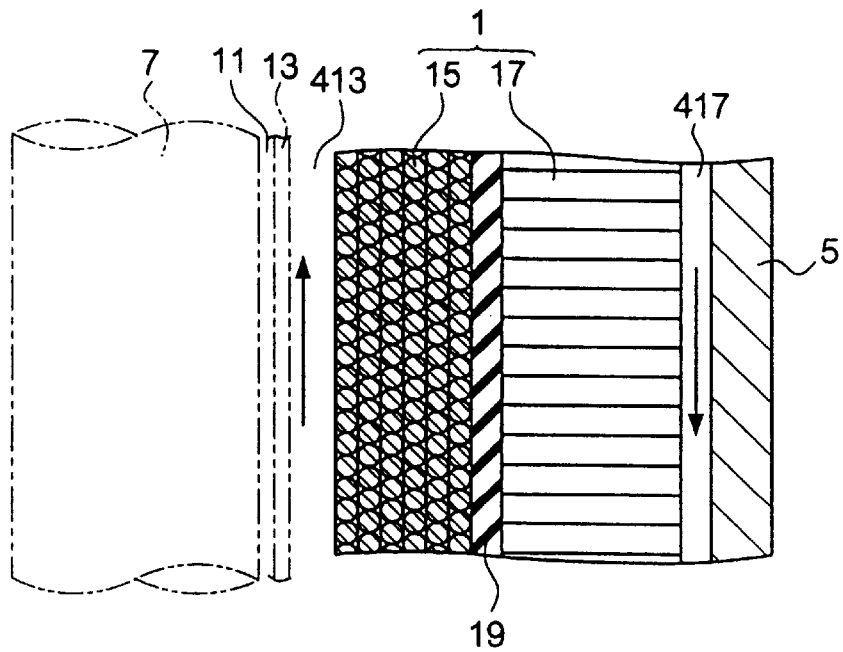
FIG. 2 is an enlarged view of the main parts of FIG. 1.

The slotless stator 1 is arranged around the rotor 7, forming a small gap 11 via an inner tube 13 as shown in FIG. 2.

This inner tube 13 as shown in FIG. 2 is for demarcating the inner peripheral path 413 of the oil passage 41 by means of the outer periphery thereof and an inner periphery of the slotless stator 1, and is made for example from a zirconia ceramic.

This zirconia ceramic is a non magnetic insulating material, being a material having no eddy current loss even with the rotor 7 rotated at high speeds (around 100,000 rpm).

Here the inner tube 13 may be replaced with another ceramic such as alumina.

The slotless stator 1 is one which is not formed with slots for securing a stator winding 15.

Moreover, the slotless stator 1 is constructed with the stator winding 15 located on the rotor 7 side and a stator core 17 located on the casing 5 side.

The stator core 17 is in the form of a hollow cylindrical body, and is secured to the casing 5 at opposite end portions so that a constant gap, that is, the outer peripheral path 417 of the oil passage 41, is formed between the outer periphery thereof and the inner periphery of the casing 5.

Moreover, the stator core 17 is constructed by laminating a large number of ring shaped electrical steel plates in the plate thickness direction. However this may also be a divided configuration.

Furthermore, the stator core 17 has a cylindrical inner peripheral surface in which slots are not formed.

The stator winding 15, as with the stator core 17, is a hollow cylindrical shape, and is secured by means of an insulation layer 19 using a thermosetting resin such as varnish so that the outer peripheral face of the stator winding 15 faces the inner face peripheral face of the stator core 17.

The slotless stator 1 comprising the above construction is manufactured through the following steps.

Figure 4:
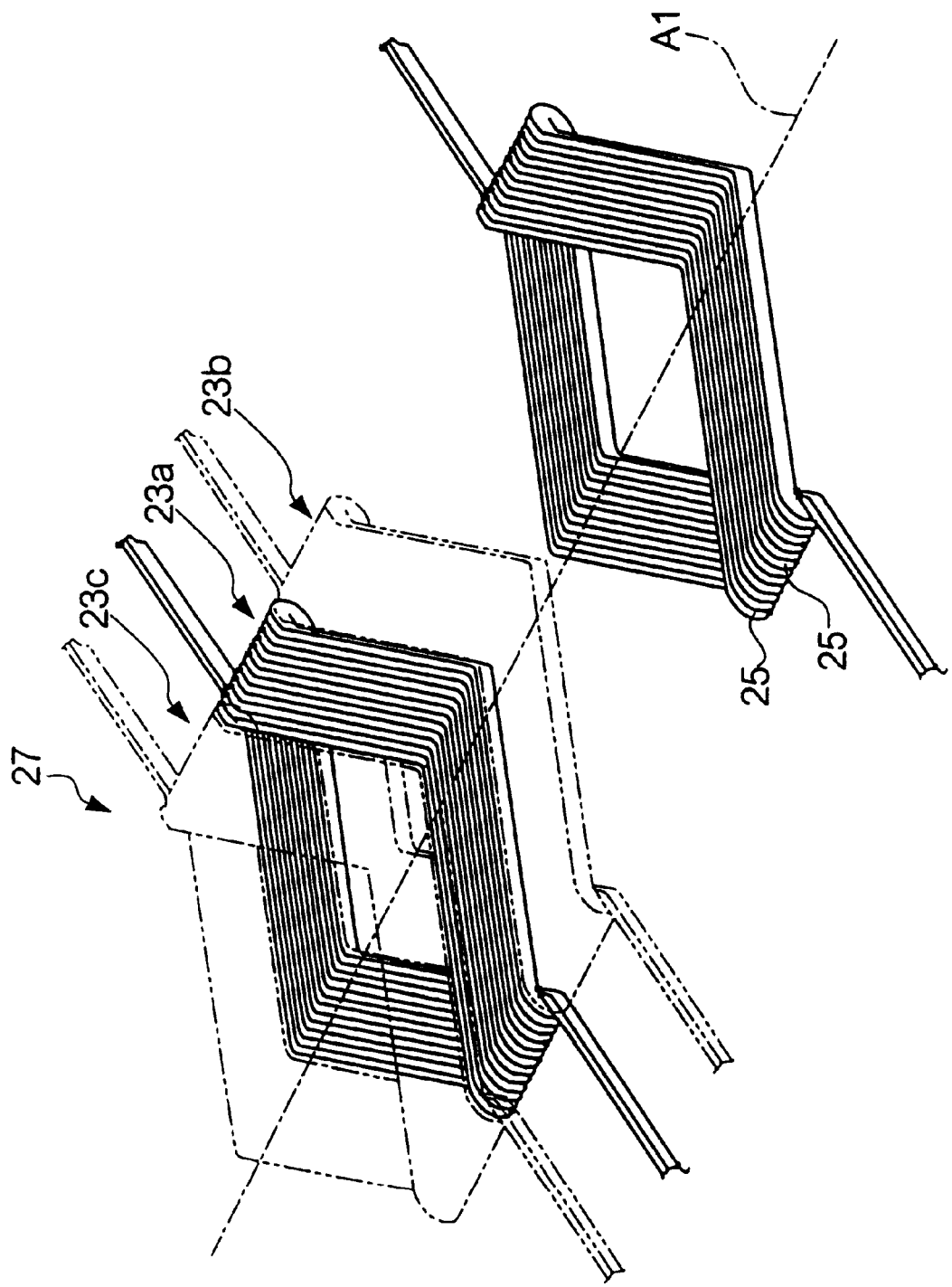
FIG. 4 is a perspective view showing a condition where a band shape body is formed from a plurality of coil segments.

At first, a hollow cylindrical shape stator winding 15 is formed by combining together a plurality of approximately rhombic shape coil segments 23a, 23b, and 23cas shown in FIG.4 .

The coil segments 23a, 23b and 23c are formed by forming turns by winding a wire sheaf 25 of a plurality of fine wires composed of conductors bundled together, through one turn in an approximate rhombic shape, and then winding and arranging a plurality of the turns so that the turns are sequentially shifted continuously so as to be adjacent to each other in the direction of one diagonal A1 of the rhombic shape (refer to FIG. 4).

Figure 5:
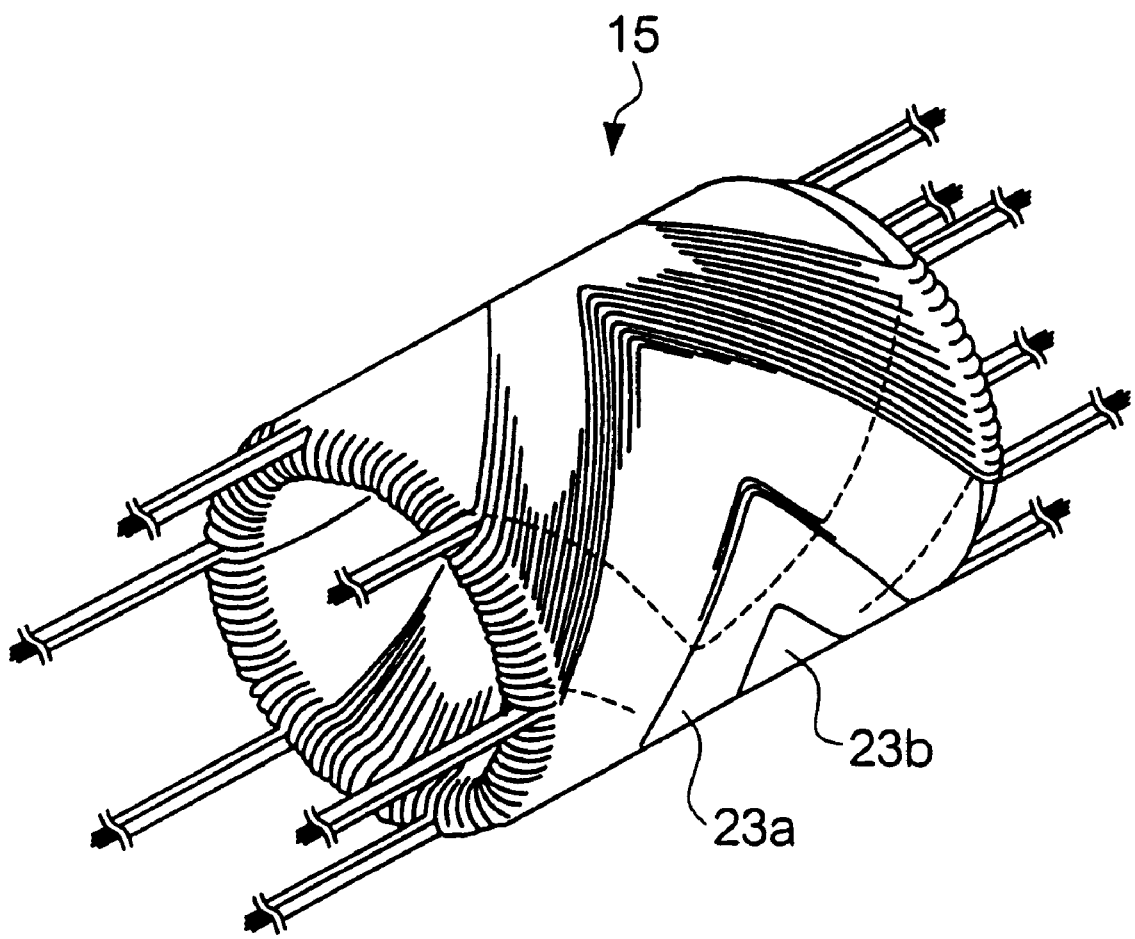
FIG. 5 is a perspective view showing a stator winding formed by rolling the band shape body comprising the plurality of coil segments, into a cylindrical shape.

Then after sequentially shifting and overlapping the coil segments 23a, 23b and 23c in the direction of the diagonal A1 to form a band shape body 27, the band shape body 27 is rolled into a hollow cylindrical shape to thereby give the hollow cylindrical shape stator winding 15 (refer to FIG. 5).

Figure 6:
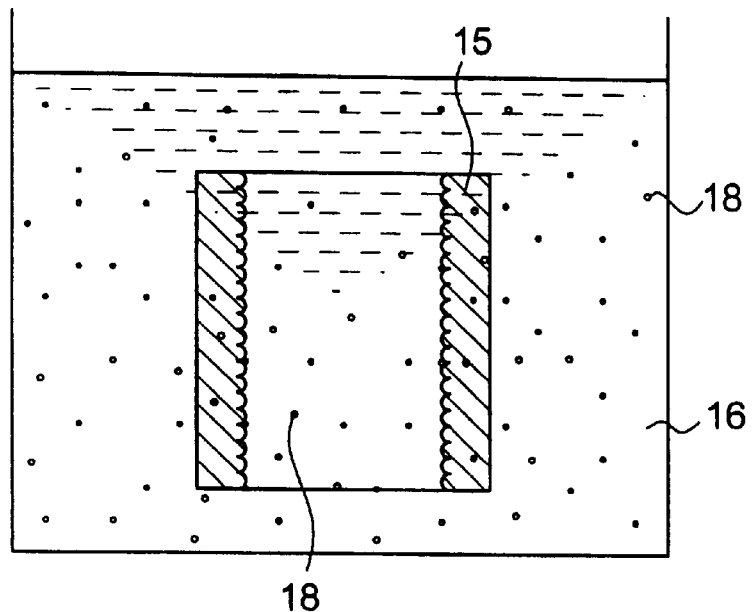
FIG. 6 is a diagram showing a condition where a stator winding is immersed in an alcohol solvent in which BN particles have been mixed.

After this, the stator winding 15 is immersed in an alcohol solvent 16 into which BN particles (thermal conducting particles) 18 have been mixed (refer to FIG. 6).

In so doing, the BN particles 18 dispersed in the alcohol solvent 16 infiltrate into the spaces between the windings. Here rather than immersing, a technique involving dripping may be used.

In this way, the BN particles 18 are extensively filled from the surface of the stator winding 15 deep into the interior.

After this, the stator winding 15 is withdrawn from the alcohol solvent 16 and air dried to evaporate the volatile alcohol.

In so doing, a stator winding 15 where the BN particles 18 are mixed deep into the interior is obtained.

Figure 7:
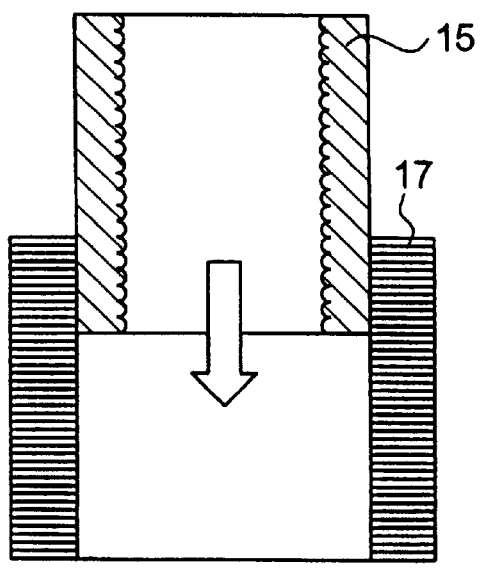
FIG. 7 is a diagram showing a condition where the stator winding is inserted into stator core.

Next a silicone sheet (in FIG. 7 this is omitted) constituting one portion of the insulating layer 19 together with varnish, is wrapped around the outer periphery of the stator winding 15, and the stator winding 15 is inserted into the stator core 17.

Figure 8:
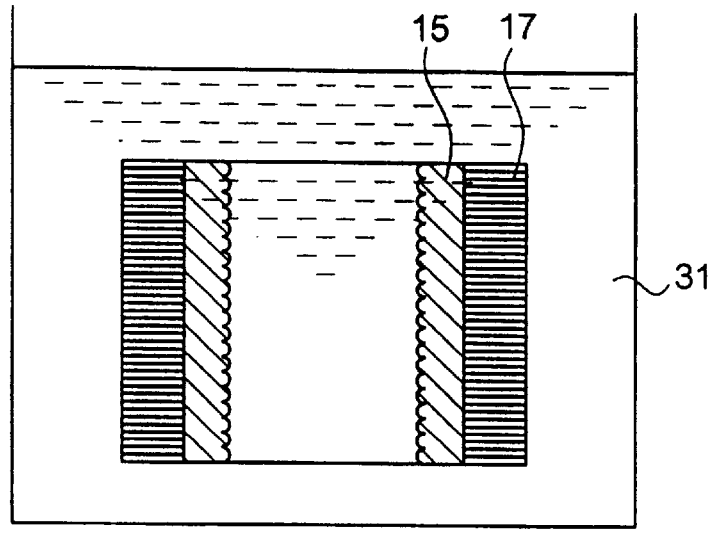
FIG. 8 is a diagram showing a condition where the stator core and stator winding are immersed in a varnish tank while being held together.

After this, the stator core 17 and the stator winding 15 are held together as one and immersed in a varnish impregnation tank 31 (refer to FIG. 8). Subsequently, these are placed in a vacuum chamber (not shown in the FIG.) and subjected to vacuum impregnation.

After this, when the varnish is impregnated into the stator winding 15, the BN particles 18 located in the surface vicinity of the stator winding 15 are dissolved into the varnish, so that the varnish with the BN particles 18 mixed therein is impregnated into the stator winding 15. In this condition, the stator core 17 and the stator winding 15 are withdrawn from the varnish impregnation tank 31 while being held together.

Figure 9:
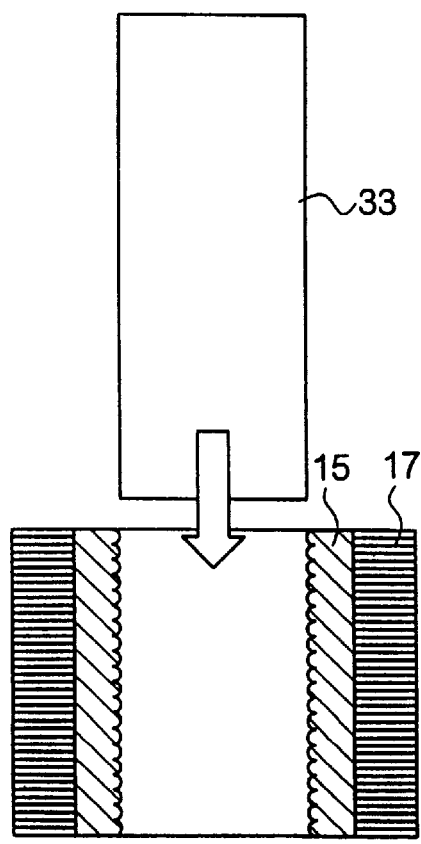
FIG. 9 is a diagram showing a condition where a mandrill is inserted into the inner periphery of the stator winding which has been inserted into the stator core.
Figure 10:
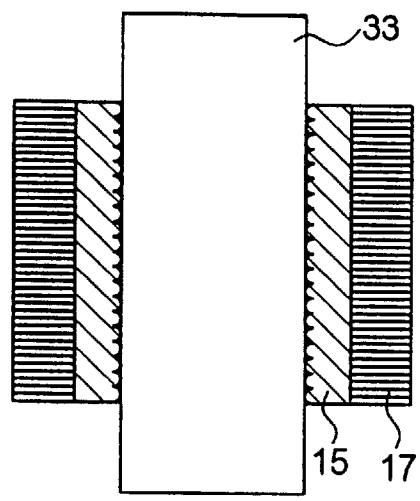
FIG. 10 is a diagram showing a condition where varnish is heat hardened with the stator core, the stator winding, and the mandrill held together as one.

Then, a fluoroplastic mandrill 33 is inserted into the inner periphery of the stator winding 15 (refer to FIG. 9), and the stator core 17, the stator winding 15 and the mandrill 33 are all heated while being held together as one, so that the varnish is heat hardened (refer to FIG. 10).

At the time of this heat hardening, the mandrill 33 thermally expands so that the diameter increases. Hence the outer periphery of the mandrill 33 contacts with the inner periphery of the stator winding 15 and presses the stator winding 15 against the side of the stator core 17.

As a result the stator winding 15 is fastened to the inner periphery of the stator core 17 by means of the varnish and the silicone sheet.

Figure 11:
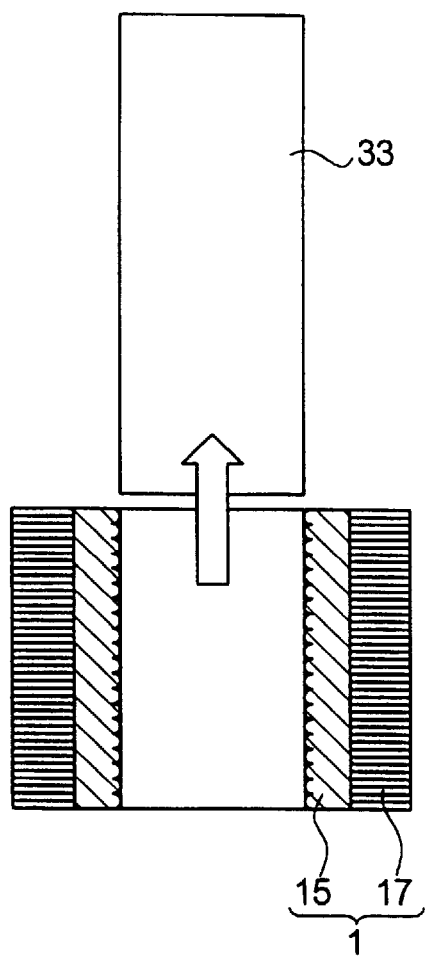
FIG. 11 is a process diagram showing a condition where after varnish hardening, the mandrill is withdrawn.

Then, after the varnish hardens the mandrill 33 is withdrawn, and the slotless stator 1 is completed (refer to FIG. 11).

At the time of operating the rotating electrical machine 3 according to this embodiment, lubrication of the bearings supporting the rotor 7, and cooling of the slotless stator 1 is carried out by circulating oil through the cooling circuit 4.

Figure 3:
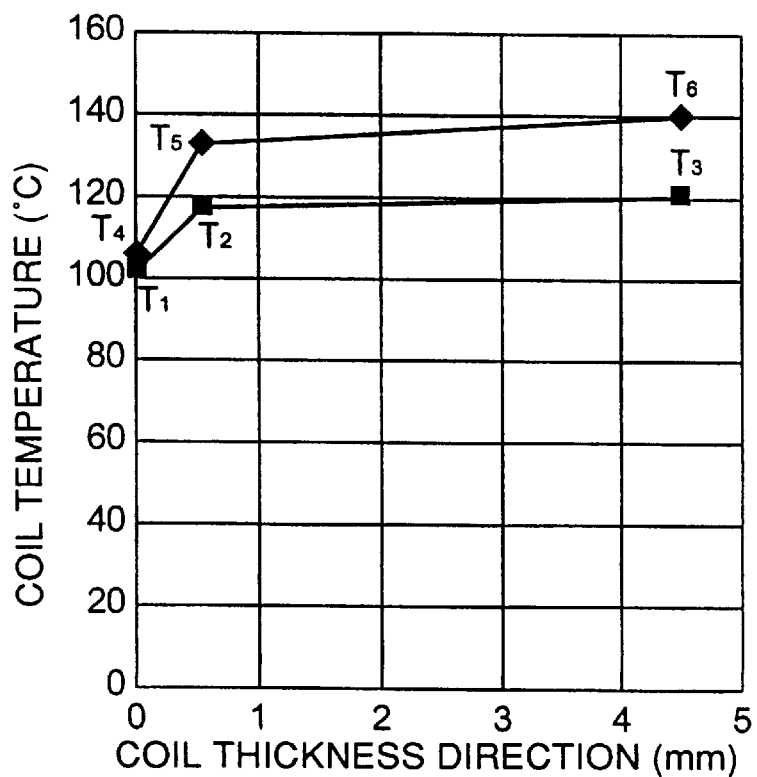
FIG. 3 is a graph for comparing an effect of improvement in heat dissipation due mixing BN particles into an impregnating resin.

Hereunder is a detailed description referring to FIG. 1 through FIG. 3, of the cooling mechanism for the slotless stator 1.

At first, oil which is pumped from the oil supply source 43 by a pump (omitted from the figure) passes through the supply path 45 and is supplied to the casing 5.

The oil supplied to the casing 5 passes through the inlet path 49 formed at one end portion thereof and is accumulated in the oil sink 411.

At this time, the oil path between the oil sink 411 and the outer peripheral path 417 is shut off by the cover plate 421, and hence the oil does not flow (back flow) to the outer peripheral path 417 formed on the outer peripheral side of the slotless stator 1.

Therefore, the oil accumulated in the oil sink 411 flows into the inner peripheral path 413 formed on the inner peripheral side of the slotless stator 1, and cools the inner periphery of the slotless stator 1.

At this time, the oil flowing into the inner peripheral path 413 is oil which has just been supplied from the oil supply source 43, in other words is low temperature oil which has not yet been supplied to cool any heat source. Hence the inner periphery of the slotless stator 1 is efficiently cooled.

Furthermore, the varnish is impregnated into the inner peripheral side of the slotless stator 1, that is, into the inner peripheral side of the stator winding 15 in a condition with, the BN particles having good thermal conductivity mixed therein, and is then hardened. Due to the synergistic effect of the improved heat dissipation due to these BN particles, and the cooling due to the low temperature oil, the inner periphery of the slotless stator 1 is very effectively cooled.

Here a part of the oil accumulated in the oil sink 411 is supplied to the bearing rotatably supporting one end of the rotor 7, to thereby provide bearing lubrication.

The oil which cools the whole surface of the inner periphery of the slotless stator 1 while flowing therealong to reach the opposite end portion of the stator is turned back in a U-turn by the turn portion 415 to thereby flow into the outer peripheral path 417 formed on the outer peripheral side of the slotless stator 1. Thus, all of the cooling liquid which flows through the outer peripheral path for cooling the outer periphery of the stator, first flows through the inner peripheral path for cooling the inner periphery of the stator.

Furthermore, a part of the oil which flows into the turn portion 415 is supplied to the bearing rotatably supporting the other end of the rotor 7, to thereby provide bearing lubrication.

Moreover, the oil which flows as far as the end of the stator near the oil sink 411 while cooling the overall surface of the outer periphery of the slotless stator 1, does not flow back to the oil sink 411 due to the presence of the cover plate 421, but passes through the lead out path 419 formed at the approximately axial central portion of the casing 5, and is discharged from the casing 5.

The oil discharged from the casing 5 passes along the return path 47 and returns to the oil supply source 43.

As described above, with the rotating electrical machine 3 according to this embodiment, the low temperature cooling liquid which has just been introduced to the housing 5, and has not yet been supplied for cooling the heat source, is promptly circulated to the inner peripheral side of the slotless stator 1 which requires much more cooling then the outer peripheral side thereof. Therefore, the temperature rise of the overall rotating electrical machine 3 can be efficiently suppressed.

Moreover, by filling the BN particles 18 into the stator winding 15, the heat dissipation efficiency of the stator winding 15 is increased, so that cooling efficiency can be further improved.

FIG. 3 is a graph showing the results of comparing heat dissipation using a ⅙th model (T1~T3) of a stator winding 15 according to the present embodiment, and a ⅙th model (T4~T6) of a stator winding which does not have BN particles 18 inside the varnish.

In this FIG., plots T1~T6 show the temperature at the following locations.

T1, T4 ; varnish surface

T2, T5; surface of stator winding

T3, T6; inside stator winding

As is clear from FIG. 3, by filling the BN particles 18 into the stator winding 15, the peak temperature (T3, T6) inside the stator winding is reduced, and it is confirmed that the temperature difference between the varnish surface and the inside of the stator winding is reduced.

Consequently, it is confirmed that even when the rotating electrical machine 3 according to the present embodiment is used as a generator and a large current flows, since heat dissipation of the stator winding 15 is effectively achieved, a high output is possible.

Therefore, with the present embodiment, heat dissipation from the inner periphery of the stator winding 15 close to the rotor 7 is improved, and cooling of the stator winding 15 is effectively performed. Therefore a drop in magnetic force due to an increase in temperature of the rotor 7 is effectively avoided, so that even when used in a high speed rotating electrical machine where the rotor 7 rotates at speeds exceeding 100,000 rpm, high efficiency generation can be realized.

Moreover, since the oil from the oil supply source 43 is also used for lubrication of the bearings supporting the rotor 7, it is possible to simplify the circuit required for lubrication and cooling. Hence highly efficient power generation can be performed with a compact construction.

Here with the abovementioned embodiment, the cyndrically shaped stator winding 15 is formed by combining together the approximately rhombic shape plurality of coil segments 23a, 23b and 23c. However this may be formed by some other method.

Moreover, the lead out path 419 of the oil passage 41 is formed in the approximately axial central portion of the casing 5. However this may be formed in the vicinity of the inlet path.

Furthermore, the present invention is not limited to a rotating electrical machine incorporating a slotless stator 1, and may of course also be applied to a rotating electrical machine incorporating a slotted stator.

As will be clear from the above description, with the present invention, by providing a cooling circuit for introducing the cooling liquid to inside the housing for cooling an inner periphery and than outer periphery of the stator in that order, low temperature cooling liquid which has just been introduced to the housing, and has not yet been supplied for cooling the heat source, is promptly circulated to the inner peripheral side of the stator which requires much cooling. Hence the temperature rise of the overall rotating electrical machine is effectively suppressed. Therefore, a drop in magnetic force of the rotor can be thus effectively avoided, so that high efficiency generation can be realized.

Moreover, by providing a back flow preventing device for preventing back flow of the cooling liquid introduced inside the housing, to an outer peripheral side of the stator, the cooling liquid introduced to inside the housing is reliably conducted to the inner peripheral side of the stator close to the rotor before to being conducted to the outer peripheral side of the stator far from the rotor. Hence efficient cooling of the rotor is even more assured.

Furthermore, by also using the cooling liquid for lubrication of the bearings supporting the rotor, the overall circuit necessary for lubrication and cooling is simplified. Therefore highly efficient power generation with a compact construction can be realized.

Moreover, by having a construction for the stator winding where heat conducting particles are filled into the stator winding, and the impregnating resin is impregnated with the heat conducting particles mixed into the impregnating resin and is then hardened, the heat dissipation of the stator winding is enhanced and hence the cooling efficiency can be further improved.

Although there have been described in detail what are at present considered to be the preferred embodiments of the invention, it will be understood by persons skilled in the art that variations and modifications may be made thereto without departing from the gist, spirit or essence of the invention. The scope of the invention is indicated by the appended claims.

What is claimed is:

1. A Totating electrical machine comprising:
   a cylindrically shaped stator accommodated inside a casing;
   a rotor rotatably supported on an inner peripheral side of said stator; and
   a cooling circuit for introducing oil as a cooling liquid to inside said casing and for cooling an inner periphery and an outer periphery of said stator in that order;
   wherein said cooling circuit comprises:
     an oil supply source for introducing said cooling liquid into said casing and for storing said oil as the cooling liquid;
     a supply path for said oil from said oil supply source to an oil path; and
     a return path for returning said oil to the oil supply source;
     wherein said oil path comprises:
       an inlet path formed at one end portion of the casing for passing through inside and outside thereof,
       an oil sink communicating with said oil path;
       an inner peripheral path communicating with said oil supply source and extending along substantially the entire inner periphery of said stator, which is slotless;
       an outer peripheral path extending along the outer periphery of the slotless stator;
       a lead out path at the approximately axial central portion of the casing and opening to the inside and outside of the casing; and
       nonreturn means for preventing back flow of the cooling liquid introduced to inside said casing, to an outer peripheral side of said stator;
       wherein all of the cooling liquid which flows through the outer peripheral path for cooling the outer periphery of the stator, first flows through the inner peripheral path for cooling the inner periphery of the stator.

2. A rotating electrical machine according to claim 1, wherein said cooling liquid, first accumulated in an oil sink, is supplied to a bearing rotatably supporting one end of the rotor to thereby provide bearing lubrcation.

3. A rotating electrical machine according to claim 1, wherein said stator includes a stator winding on an inner peripheral side thereof, and heat conducting particles filled into said stator winding.

4. A rotating electrical machine according to claim 2, wherein said stator includes a stator winding on an inner peripheral side thereof, and varnish is impregnated into the inner peripheral side of the stator winding in a condition with boron nitride particles having good thermal conductivity mixed therein and is then hardened.

5. A rotating electrical machine according to claim 3, wherein said heat conducting particles comprise boron nitride particles.

6. A rotating electrical machine according to claim 3, wherein said stator further comprises a resin impregnated into said stator winding and hardened.

7. A rotating electrical machine according to claim 6, wherein at least some of said heat conducting particles are mixed in said resin.

8. A rotating electrical machine according to claim 1, wherein said rotor rotates at speeds exceeding several ten thousand rpm.

9. A rotating electrical machine according to claim 1, wherein said cooling liquid contacts the outer periphery of the rotor and the inner periphery of said stator as the cooling liquid flows through said inner peripheral path.

* * * * *

UNITED STATES PATENT AND TRADEMARK OFFICE
CERTIFICATE OF CORRECTION

PATENT NO. : 6,489,697 B1
DATED : December 3, 2002
INVENTOR(S) : Masaru Ozawa and Kenrou Udono It is certified that error appears in the above-identified patent and that said Letters Patent is hereby corrected as shown below:

Title page,
Item [57], ABSTRACT,
Line 1, after "includes" delete the comma; delete "4 is";
Line 2, delete "provided";
Line 6, change "housings" to -- housing --; delete "1".

Column 1,
Line 15, after "known" insert a comma.
Line numbered between 26 and 27, change "itself however" to -- itself, however, --.
Line numbered between 51 and 52, change "for introduces" to -- introduces --.
Line 60, change "sator" to -- stator --.

Column 2,
Line 2, delete "to".
Line 4, change "before to being" to -- before being --.
Line 14, after "impregnated" delete the comma.
Line 15, after "winding" insert a comma.
Line 41, after "into" insert -- a --.
Line numbered between 45 and 46, change "mandrill" to -- mandrel --.
Lines 51 and 53, change "mandrill" to -- mandrel --.
Line 65, change "easing" to -- casing --; after "rotor" insert -- 7 --.

Column 3,
Line 4, change "cooling" to -- (cooling --.
Line 36, after "13" insert a comma.

Column 4,
Line 8, change "23cas" to -- 23c, as --.
Lines 55, 57, 60 and 62, change "mandrill" to -- mandrel --.

Column 5,
Line 1, change "mandrill" to -- mandrel --.
Line 8, after "description" insert a comma.
Line 34, after "with" delete the comma.
Line 36, change "the synergistic" to -- a synergistic --.

Column 6,
Line 4, change "then" to -- than --.
Line 53, change "approxinately" to -- approximately --.
Line 62, delete "to".
Line 63, change "than" to -- then --.

UNITED STATES PATENT AND TRADEMARK OFFICE
CERTIFICATE OF CORRECTION

PATENT NO.    : 6,489,697 B1
DATED         : December 3, 2002
INVENTOR(S)   : Masaru Ozawa and Kenrou Udono It is certified that error appears in the above-identified patent and that said Letters Patent is hereby corrected as shown below:

<u>Column 7,</u>
Line 10, change "before to being" to -- before being --.
Line 33, (1st line of claim 1), change "Totating" to -- rotating --.
Line 52, (19th line of claim 1), change the comma to a semi-colon.

Signed and Sealed this

Tenth Day of June, 2003

JAMES E. ROGAN
*Director of the United States Patent and Trademark Office*